United States Patent [19]
White

[11] Patent Number: 5,605,213
[45] Date of Patent: Feb. 25, 1997

[54] INSTANT ACTUATOR FOR SPLIT AXLE DRIVE MECHANISM

[76] Inventor: Richard E. White, 6625 SW. McEwan Rd., Lake Oswego, Oreg. 97035

[21] Appl. No.: 361,738

[22] Filed: Dec. 21, 1994

[51] Int. Cl.$^6$ .................................................. F16D 19/00
[52] U.S. Cl. .................... 192/82 R; 192/995; 74/502; 74/503; 180/247
[58] Field of Search ........................... 192/82 R, 49, 192/50, 995, 99 R; 74/501.6, 502, 503; 180/247

[56] References Cited

U.S. PATENT DOCUMENTS

| | | | |
|---|---|---|---|
| 4,381,828 | 5/1983 | Lunn et al. | 180/247 |
| 4,407,387 | 10/1983 | Lindbert | 180/247 |
| 4,452,331 | 6/1984 | Lunn et al. | 180/247 |
| 4,699,235 | 10/1987 | Anderson | 180/247 |

*Primary Examiner*—Andrea L. Pitts
*Attorney, Agent, or Firm*—Klarquist Sparkman Campbell Leigh & Whinston, LLP

[57] ABSTRACT

An apparatus for operating a clutch in a split-axle mechanism of a vehicle for instantaneously engaging four-wheel drive. In a preferred embodiment the apparatus includes a cable operatively connected to a control switch within the passenger compartment of the vehicle and an actuator, adjacent to the split axle mechanism. Activation of the switch causes instantaneous movement of the cable which, in turn, instantaneously causes the actuator to engage or disengage the clutch. When the clutch is engaged, the split axles rotate together. When the clutch is disengaged, the split axles rotate independently. In another embodiment a locking device is used to lock the actuator in position. The actuator can be locked to engage or disengage the clutch for enabling or disabling four-wheel drive.

18 Claims, 2 Drawing Sheets

1

INSTANT ACTUATOR FOR SPLIT AXLE DRIVE MECHANISM

FIELD OF THE INVENTION

This invention relates generally to split-axle drive mechanisms, and more particularly to an apparatus for instantaneously engaging a clutch in a split-axle mechanism of a vehicle to provide four-wheel drive capability.

BACKGROUND OF THE INVENTION

Since the Second World War, two-wheel drive vehicles with a four-wheel drive option have become increasingly popular. These vehicles had shift on the fly, or 4×4 action at the operator's command. As time passed and the desires for fuel economy grew, it was desirable to not back-drive a front differential assembly, thereby reducing friction and increasing fuel economy. During that time, all or most four wheel drive vehicles had solid front axles or differential assemblies able to full-float the front wheels through the use of locking hub assemblies.

With the desire to give the operator more convenience, (not having to stop, get out, and lock hubs to provide 4×4 action) the industry designed a split-axle system, thereby back driving only the axles and axle gears. This system created a need to have all gears rotating in the same direction before engagement, but a time delay was required. These systems—including vacuum cable, electronic shift motors, solenoid, and thermogas operated—have a high failure rate and do not always operate instantly when needed. The systems further lack the ability to be controlled from inside the cab by the operator at his or her will, and the systems incorporate unnecessary vacuum or electronic sources.

An example of the more recent technology is shown and described in U.S. Pat. No. 4,699,235. As disclosed therein, most modern four-wheel drive vehicles utilize a transfer case that provides powerflow to the front and rear differentials. In two-wheel drive, the transfer case allows the powerflow to only the rear differential unit while isolating the front differential unit. Consequently, the transfer case allows for superior fuel economy and less gear wear when the vehicle is driven on improved roads where four-wheel drive is not required. In four-wheel drive, the transfer case provides power to both the rear and front differentials allowing for increased vehicle control.

Some four-wheel drive vehicles also contain a split-axle mechanism including a split-axle clutch. The split-axle clutch is positioned between the front right wheel's axle and the front differential axle (thus, the wheel's axle is "split" from the front differential axle). When engaged, the clutch provides lock-up between the front axle and the wheel axle allowing powerflow to both front wheels.

Connecting the powerflow from the transfer case to the front axle is accomplished by the front drive shaft and front differential unit. The front differential unit contains a series of planetary gears permitting the front wheels to be driven at different speeds while the vehicle is turning. In four-wheel drive the entire differential unit (and the planetary gears) conjunctively rotates with the front axle. Thus, through a series of gears (pinion and ring gear), the front differential unit accepts powerflow from the transfer case and delivers it to the front axle.

In two-wheel drive the transfer case and the split-axle clutch are disengaged. Additionally, the front differential unit remains motionless as a result of not being driven by the transfer case. Nonetheless, the forward motion of the front wheels backdrives the axles and front differential's planetary gears.

The backdriven axles rotate the planetary gears and the opposing axle gear in a direction opposite to the direction they rotate when the vehicle is in four-wheel drive or when the split-axle clutch is in a locked position. As a result, when the transfer case is activated to place the vehicle in four-wheel drive, a time delay is required before engaging the clutch to enable the planetary gears to slow down, stop, and begin proper rotation.

Backdriving the front differential unit also causes excessive wear on the axle and planetary gears. As a result, metal grindings created by the planetary gear's wear circulates through lubricant around the front axles, causing damage to other parts in the front axle.

To shift into four-wheel drive, the driver activates a switch inside the passenger compartment to cause the transfer case to switch power to the front axle. The clutch can not be activated, however, because the planetary gears are not rotating in the proper direction. As power increases from the transfer case, the planetary gears begin proper rotation.

Meanwhile, with the technology described in U.S. Pat. No. 4,699,235, a linear actuator is operated to engage the clutch. The linear actuator has an electric heater in a chamber filled with thermally expansible and contractible pressure transmitting fluid capable of undergoing a liquid to gas phase change upon heating. When the heater is activated, the gas expands and pushes a piston rod connected to the clutch assembly which engages the clutch. The heating process delays the action of the actuator for a sufficient time to allow the planetary gears to rotate in the proper direction.

One problem with this prior art approach is that the procedure to transfer from two-wheel to four-wheel drive may take several minutes or more, depending upon the ambient temperature surrounding the vehicle; the colder the weather, the more time needed to heat the actuator gas.

Another problem is wear on the front wheel drive differential. The metal grindings created by the wear of the axle and planetary gears circulates via the differential fluid throughout the entire front axle, possibly damaging other lubricated parts.

Yet another problem with the prior art approach is that when the vehicle is switched off, the gas cools in the linear actuator and the split-axle clutch disengages. When the vehicle is restarted, the process of heating the gas begins again. As before, several minutes may be required before the split-axle clutch engages and the vehicle is actually in four-wheel drive.

Accordingly, an object of the invention is to provide an apparatus that (when locked) instantaneously converts a two-wheel drive vehicle into four-wheel drive at the operator's command. Another object of the invention is to provide an apparatus that reduces the wear of the front wheel drive differential of a vehicle. Yet another object of the invention is to provide an apparatus that maintains a vehicle in four-wheel drive when the vehicle is turned off. Yet another object of the invention is to provide such a apparatus that is low cost and reliable. These and other objects of the invention will become more apparent from the following detailed description of a preferred embodiment.

SUMMARY OF THE INVENTION

In accordance with the invention, an apparatus for instantaneously switching a vehicle into four-wheel drive is shown and described herein. The apparatus provides for independent control of the transfer case and the split-axle clutch. Consequently, the clutch may, for example, be engaged with the transfer case deactivated or, alternatively, the clutch may be disengaged while the transfer case is activated. In either case, the differential's planetary gears are not backdriven. Instead, the entire differential unit conjunctively rotates with the front axle to reduce wear on the planetary gears. Additionally, both the clutch and transfer case may be engaged for four-wheel drive or disengaged for two-wheel drive.

In one embodiment of the invention, the apparatus includes an actuator operatively connected to the split-axle clutch for engaging and disengaging the clutch to allow the split axles to rotate together or independently. The apparatus may also include a control switch and a connector which is preferably a cable. When the switch is activated, it actuates the connector which, in turn, operates the actuator. The result is that the clutch is instantaneously engaged or disengaged.

In another embodiment of the invention, the cable may be replaced by a locking device such as a pair of set screws. In this embodiment, a rod within the actuator is operatively connected to the clutch of the split-axle mechanism for engaging the clutch to cause the split axles to rotate together and for disengaging the clutch to allow the split axles to rotate independently. The apparatus may further include a body slidably supporting the rod and a locking device operatively connected to the body for locking the rod to engage or disengage the clutch of the split-axle mechanism.

The above-described features and advantages of the present invention will be more readily apparent from the following detailed description of a preferred embodiment, which proceeds with reference to the accompanying drawings.

DETAILED DESCRIPTION OF THE PREFERRED EMBODIMENT

To provide a comprehensive disclosure of relevant basic technology without unduly lengthening this specification, U.S. Pat. No. 4,699,235 is hereby incorporated by reference.

Figure 1:
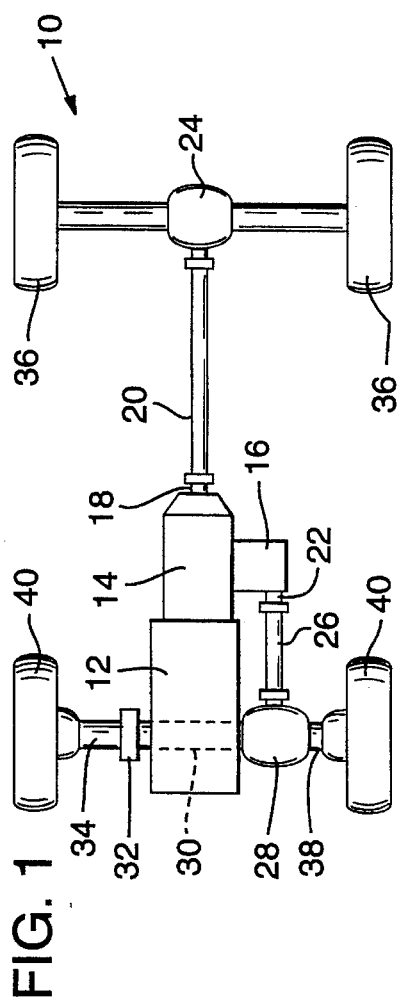
FIG. 1 is a plan view of a vehicle having a split-axle drive mechanism according to the invention.

Referring to FIG. 1, a schematic plan view of a four-wheel drive vehicle 10 is shown to comprise an internal combustion engine 12, transmission 14, transfer case 16, and a split-axle mechanism 32 which includes a split-axle clutch. The engine, transmission, and transfer case are all well-known components. The transfer case 16 has a main output shaft 18 and an auxiliary output shaft 22. The main output shaft is connected to an input shaft in the transfer case 16 and is customarily aligned with it. The auxiliary output shaft 22 is connected to the input shaft by a clutch in the transfer case 16. The transfer case clutch (not shown) is activated by a transfer case switch (not shown) which is controlled by the vehicle driver.

The main output shaft 18 is connected to a rear propeller shaft 20. The rear propeller shaft is connected to a rear differential 24, which drives a pair of rear wheels 36 in a well-known manner.

In four-wheel drive mode, the transfer case 16 is actively driving the auxiliary output shaft 22 which in turn is connected to a front drive shaft 26. The drive shaft 26 is operatively connected to a front differential 28 through a ring gear (not shown). The differential unit 28 and its internal planetary gears (not shown) conjunctively rotate with left-front axle 38 and right-front stub axle, or shaft, 30.

In four-wheel drive mode, engaging the split-axle clutch causes the right-front stub axle 30 and the right front-wheel axle, or shaft, 34 (by way of the mechanism 32) to conjunctively rotate with front differential 28. Consequently, the transfer case 16 drives both front wheels 40.

Figure 2:
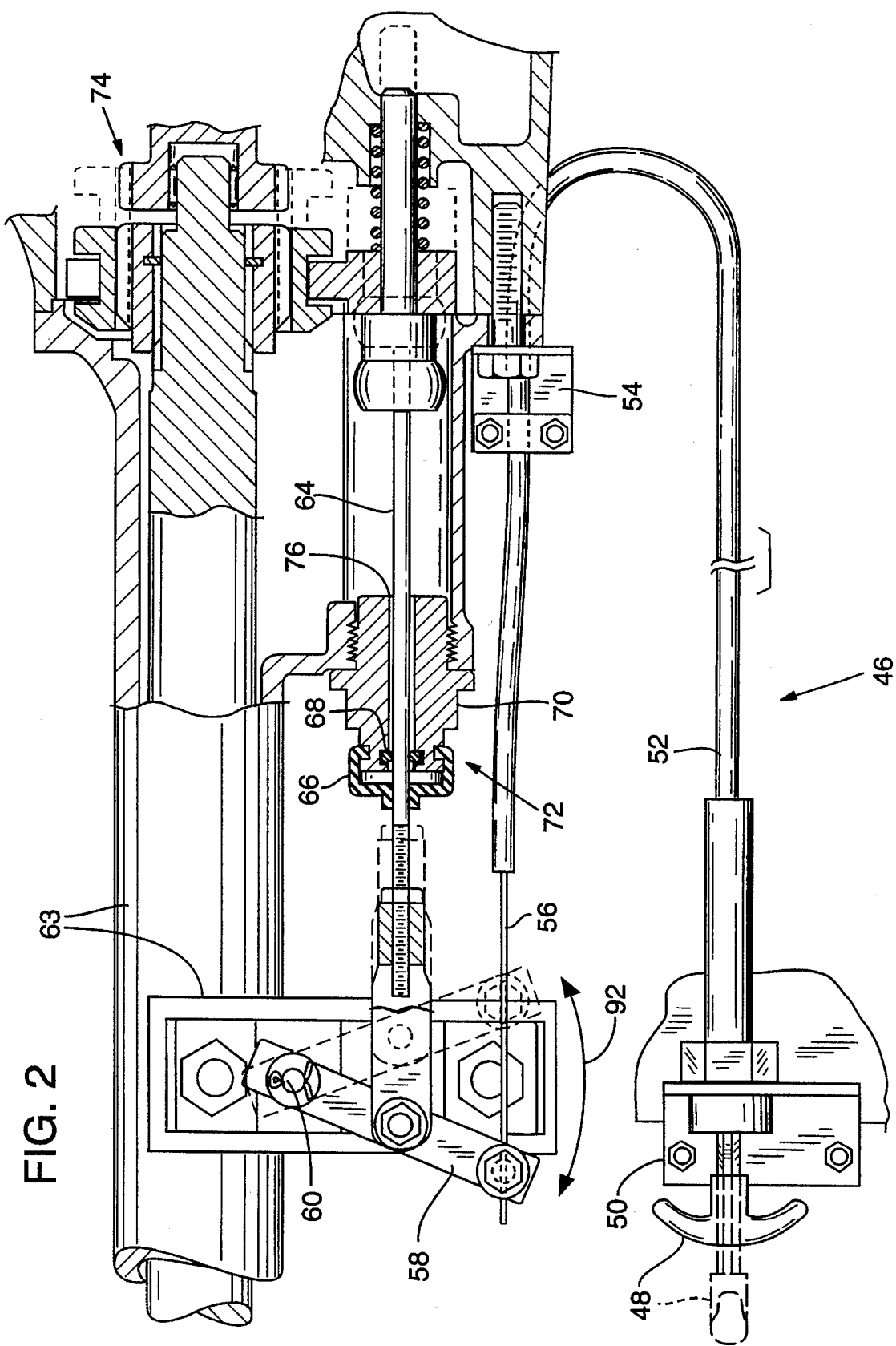
FIG. 2 is a fragmentary view of a preferred embodiment of the actuator and split-axle drive mechanism using a cable and control switch for operator control.

Referring now to FIG. 2, an apparatus 46 in accordance with the invention is shown. The apparatus includes a control switch 48, a connector such as a cable 56, and an actuator 72 for activating the mechanism 32. Apparatus 46 is mounted partly within the passenger compartment of the vehicle 10 and partly to the front axle components of the vehicle.

The control switch 48 is mounted for access from the passenger compartment of the vehicle 10 such as to the dashboard. The switch 48 has two positions shown by the solid and dotted lines. The solid lines indicate the switch in the deactivated position. To activate the control switch, the operator pulls the illustrated handle away from the mounting bracket 50. The operator may then lock the control switch in the activated position by rotating the control switch 90 degrees to the position shown by the dotted lines. To deactivate the switch, the operator rotates the control switch 90 degrees to the original position and pushes the control switch to the position shown by the solid lines. Although different electrical, mechanical, hydraulic, or vacuum switches may be employed, in the illustrative embodiment the control switch 48 is a T-handle twist-to-lock type.

It will be understood by those skilled in the art that the control switch 48 operates independently from the transfer case 16. The term "independently" means that the control switch may be activated and deactivated regardless of the state of the transfer case 16. For example, the control switch may be activated (when the vehicle is stopped) while the transfer case is deactivated.

The activation and deactivation of the switch causes a corresponding actuation in the cable 56. The illustrated connector is preferably a cable, but the invention is not limited by the physical type of connector employed. For example, other electric, mechanical, or hydraulic connectors that always respond instantaneously to control switch 48, regardless of whether the vehicle engine or other power source are on or off, may possibly be utilized. In the illustrated embodiment, the actuation of the cable 56 refers to instantaneous movement of the cable in response to the activation or deactivation of the control switch 48.

In the illustrated embodiment, the cable 56 is enclosed within a conduit 52. The conduit mounts the cable 56 to the vehicle 10 and protects the cable as it slides within the conduit 52. The conduit is mounted within the engine compartment of the vehicle using a conduit clamp 54 bolted to the axle mechanism. The conduit 52 is also mounted within the passenger compartment of the vehicle by a bracket 50, allowing the driver to have easy access to switch 48.

The cable 56 is connected at one end to the control switch 48 and is connected at the other end to a lever 58 pivotally mounted at 60 to an axle bracket on an axle housing 63. The lever 58 operably connects the cable to an actuator 72. Of course, the invention is not limited to any particular device used to connect the cable to the actuator. The illustrated design uses a bell crank lever which is defined as a lever consisting of two arms with a pivot at their junction. Other equivalent connections may be employed.

The lever 58 is shown in both solid and dotted lines in FIG. 2 to illustrate the pivotal movement of the lever. When the control switch 48 is deactivated, the lever 58 is in the position shown by the solid lines. When the control switch is activated, the lever pivots along the arc shown by arrow 92 to the activated position shown by dotted lines.

The actuator 72 includes a body 70, a rod 64, an O-ring 68, and a boot 66. The lever 58 is connected to the actuator 72 via the rod 64. The body 70 includes a bore 76 so that the rod can slide within the body. Body 70 is also threaded so that it may be screwed into housing 63. The O-ring 68 allows the rod 64 to pass into the body 70 while creating a seal to prevent leakage of lubricant from within the body. The boot 66 is preferably a rubber composition and is mounted onto the body by sliding it over the body and locking it into place. The boot acts to protect the O-ring 68 by preventing contaminants from entering the body. Additionally, the boot cleans the rod 64 as the rod moves in and out of the body. Because the illustrative embodiment contains few mechanical parts, the apparatus has a high degree of reliability. Additionally, the embodiment's mechanical parts work independently of the ambient temperature and electric current.

Figure 3:
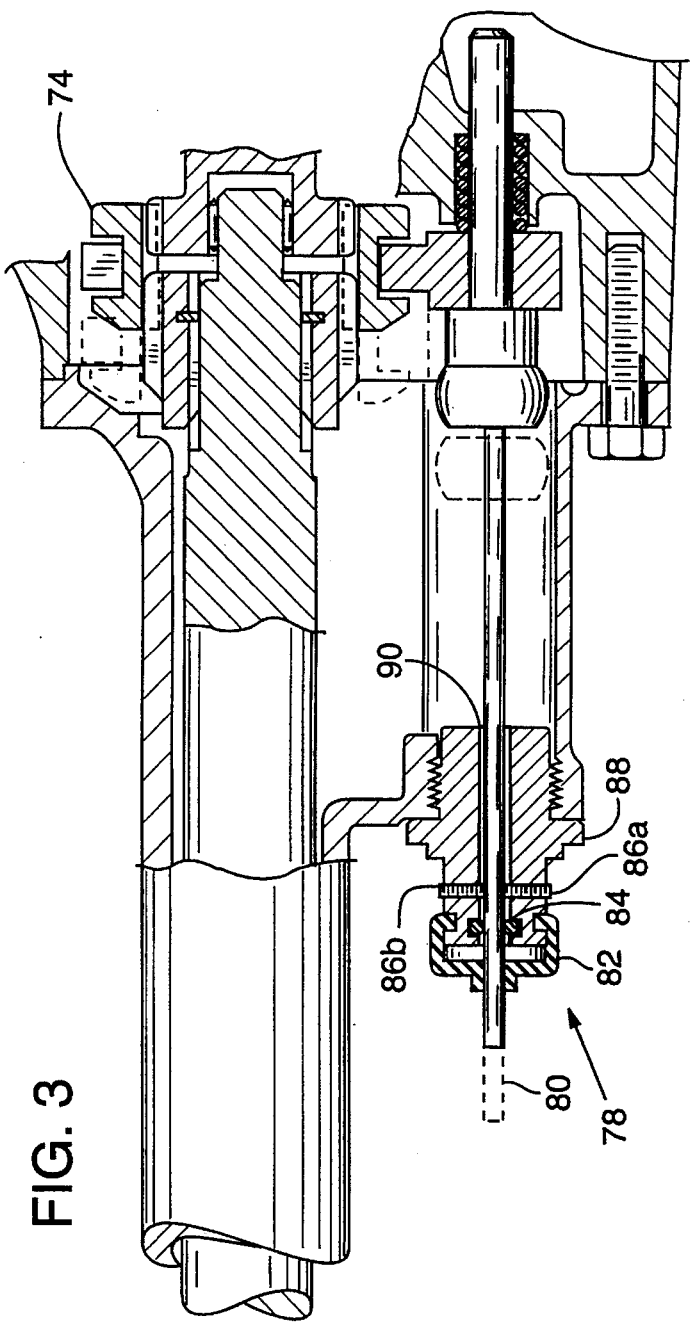
FIG. 3 is a fragmentary view of another embodiment of the actuator in full locked position with no remote operator control.

A second embodiment of the present invention is seen in FIG. 3. An actuator 78 includes a body 88, a boot 82, an O-ring 84, a bore 90, and a rod 80, all of which have similar operation as seen in FIG. 2 except that rod 80 is not connected to the lever 58.

Additionally, FIG. 3 includes a locking device such as a pair of set screws 86a and 86b. The set screws 86a, 86b are positioned within threads in the body, allowing the set screws to be tightened or loosened. When loosened, the rod 80 can slide through the body 88 and, when tightened, the set screws 86a, 86b lock the rod 80 in place. The rod can be locked for continuously engaging the split-axle clutch 74 or, alternatively, continuously disengaging the clutch 74. The illustrated design uses two set screws, but any number of screws or other types of equivalent locking devices may be employed. The solid lines shown in FIG. 3 indicate the actuator 78 in the activated position so that the clutch 74 is continuously engaged. Alternatively, the set screws 86a, 86b can lock the actuator in position shown by dotted lines. This position continuously disengages the clutch.

In operation, there are several possible ways to activate four-wheel drive. The first way is to activate the transfer case 16 (FIG. 1) to deliver powerflow to the differential unit 28. The differential unit will thereafter conjunctively rotate with the front axles 30 and 38 while the differential's planetary gears remain idle. This eliminates unnecessary wear in the planetary gears. When the split-axle clutch assembly 32 is disengaged, the right front-wheel axle 34 rotates independently from right-front stub axle 30. The operator must (when the vehicle is moving) then activate the control switch 48, seen in FIG. 2, by pulling the switch handle and twisting it to lock the cable 56 into position. The pulling action will force the cable 56 to pull lever 58 to the position indicated by the dotted lines in FIG. 2. The lever's movement instantaneously moves the rod 64 through the body 70 to engage the split-axle clutch 74. This allows for instantaneous engagement of four-wheel drive in response to actuation of switch 48.

To disengage the clutch 74, the control switch 48 is twisted to the unlocked position and the handle is pushed toward bracket 50. This forces the lever 58 to the position shown in FIG. 2 by solid lines. This motion forces rod 64 to disengage the clutch 74 and thereby disengage axle 30 from axle 34.

A second way for instantaneous engagement of four-wheel drive is accomplished by engaging the split-axle clutch assembly 32 while the transfer case is deactivated. With the clutch 74 engaged the differential unit 28 conjunctively rotates with the front axles 38, 30 and 34. The transfer case can then be activated to instantaneously engage four-wheel drive. Moreover, if the vehicle is turned off, the clutch 74 will remain engaged so that when the vehicle is repowered it will instantaneously be in four-wheel drive.

From these described ways, it should be apparent to one skilled in the art that the control switch 48 works independently from the transfer case 16 and the transfer case switch.

Having illustrated and described the principles of the invention in preferred embodiments, it should be apparent to those skilled in the art that the invention can be modified in arrangement and detail without departing from such principles. Therefore, the illustrated embodiment should be considered only an example of the invention and not a limitation on the scope of the claims. I therefore claim as my invention all modifications and equivalents to the illustrated embodiment coming within the scope and spirit of the following claims.

I claim:

1. An apparatus adapted to operate a clutch in a split-axle mechanism of a vehicle, comprising:

an actuator adapted to be operatively connected to the clutch in the split-axle mechanism for engaging the clutch to cause two shafts of a split axle to rotate together and for disengaging the clutch to allow the shafts of the split axle to rotate independently;

a cable operatively connected to the actuator for operating the actuator, the cable being adapted for engaging or disengaging the clutch from the split-axle mechanism; and a control switch operatively connected to the cable for instantaneously moving the cable to operate the actuator and adapted to instantaneously engage or disengage the clutch;

wherein the control switch includes a lock operable for preventing movement of the cable once the cable is moved to operate the actuator.

2. The apparatus of claim 1 wherein the lock is a turn-to-lock type.

3. The apparatus of claim 1 wherein the control switch is connected to one end of the cable and the actuator is operatively connected to another end of the cable.

4. The apparatus of claim 1 wherein the cable is operatively connected to the actuator through a lever.

5. The apparatus of claim 1 wherein the cable is operatively connected to the actuator through a lever pivotally mounted to a support bracket.

6. The apparatus of claim 1 wherein the control switch is accessible from within a passenger compartment of the vehicle.

7. The apparatus of claim 1 including a conduit in which the cable is enclosed, the cable movable relative to the conduit.

8. The apparatus of claim 1 wherein the actuator includes a rod for engaging the clutch, the rod operatively connected to the cable.

9. An actuator adapted to be operatively connected to a clutch of a split-axle mechanism for engaging the clutch to cause two shafts of a split axle to rotate together and for disengaging the clutch to allow the shafts of the split axle to rotate independently, comprising:

a rod adapted to be operatively connected to the clutch of the split-axle mechanism for engaging the clutch to cause the shafts of the split axle to rotate together and for disengaging the clutch to allow the shafts of the split axle to rotate independently;

a body slidably supporting the rod; and a locking device operatively connected to the body for locking the rod in a selected position, the locking device adapted to lock the rod in a position that engages or disengages the clutch of the split-axle mechanism.

10. The actuator of claim 9 wherein the locking device is a set screw operatively connected to the body.

11. An apparatus for instantaneously switching a part-time four-wheel drive vehicle between a two-wheel drive mode and a four-wheel drive mode by operating a clutch in a split-axle mechanism of the vehicle, the apparatus comprising:

an actuator adapted to be operatively connected to the clutch for engaging the clutch to cause two shafts of a split axle to rotate together and for disengaging the clutch to allow the shafts of the split axle to rotate independently, the actuator including a rod adapted to be connected to the clutch and a body having a bore in which the rod slides;

a lever pivotably mounted adjacent to the actuator;

a cable connected at one end to the lever wherein the lever is also connected to the rod so that movement of the cable instantaneously moves the lever, thereby moving the rod for engaging or disengaging the clutch from the split-axle mechanism; and a control switch operatively connected to another end of the cable for instantaneously moving the cable to operate the actuator for instantaneously engaging or disengaging the clutch, wherein the control switch has a lock operable for preventing movement of the cable once the cable is moved to engage the clutch, the control switch being located within a passenger compartment of the vehicle.

12. An apparatus adapted to operate a clutch in a split-axle mechanism of a vehicle having a split axle, a transfer case and a transfer case switch for operating the transfer case, comprising:

an actuator adapted to be operatively connected to the clutch in the split-axle mechanism for engaging the clutch to cause two shafts of the split axle to rotate together and for disengaging the clutch to allow the shafts of the split axle to rotate independently;

a connector operatively connected to the actuator for instantaneously operating the actuator, the connector being adapted to engage or disengage the clutch from the split-axle mechanism; and a control switch accessible from a passenger compartment of the vehicle and adapted to be operable independent of the transfer case, the control switch operatively connected to the connector for instantaneously operating the actuator adapted for instantaneously engaging or disengaging the clutch.

13. The apparatus of claim 12 wherein the connector is a cable.

14. The apparatus of claim 12 wherein the connector is directly connected to the control switch.

15. The apparatus of claim 12 wherein the connector is directly connected to the actuator.

16. The apparatus of claim 12 wherein the control switch is mounted within the passenger compartment.

17. An apparatus for operating a clutch in a split-axle mechanism of a vehicle having a passenger compartment, comprising:

an actuator adapted to be operatively connected to the clutch in a split-axle mechanism for engaging the clutch to cause two shafts of a split-axle to rotate together and for disengaging the clutch to allow the shafts of the split-axle to rotate independently;

a cable operatively connected to the actuator for operating the actuator, the cable being adapted for engaging or disengaging the clutch from the split-axle mechanism; and a control switch operatively connected to the cable for instantaneously moving the cable to operate the actuator and adapted to instantaneously engage or disengage the clutch;

wherein the cable is adapted to extend into the passenger compartment of the vehicle.

18. The apparatus of claim 17 wherein the cable is adapted for allowing an operator to manually move the cable for instantaneously engaging or disengaging the clutch.

* * * * *